US012561046B2

(12) United States Patent
Nakamoto

(10) Patent No.: US 12,561,046 B2
(45) Date of Patent: Feb. 24, 2026

(54) INFORMATION PROCESSING APPARATUS AND INFORMATION PROCESSING METHOD FOR SPECIFYING A CHANGED DISPLAY CONTENT

(71) Applicant: CANON KABUSHIKI KAISHA, Tokyo (JP)

(72) Inventor: Hiroshi Nakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 18/296,650

(22) Filed: Apr. 6, 2023

(65) Prior Publication Data

US 2023/0342004 A1 Oct. 26, 2023

(30) Foreign Application Priority Data

Apr. 26, 2022 (JP) ................................. 2022-072425

(51) Int. Cl.
*G06F 3/0488* (2022.01)
*G06F 3/0482* (2013.01)
*G06F 16/583* (2019.01)
(52) U.S. Cl.
CPC .......... *G06F 3/0482* (2013.01); *G06F 3/0488* (2013.01); *G06F 16/583* (2019.01)
(58) Field of Classification Search
CPC .. G06F 3/0482; G06F 3/0488; G06F 3/04883; G06F 16/583
See application file for complete search history.

(56) References Cited

U.S. PATENT DOCUMENTS

| | | | | |
|---|---|---|---|---|
| 9,251,395 | B1 * | 2/2016 | Botchen | G06Q 50/01 |
| 11,036,724 | B2 * | 6/2021 | Huang | G06F 16/2428 |
| 11,270,215 | B2 * | 3/2022 | Reyes | H04L 67/535 |
| 11,276,153 | B2 * | 3/2022 | Gupta | G06T 5/50 |
| 2014/0071171 | A1 * | 3/2014 | Mcgowan | G06F 3/04883 |
| | | | | 345/173 |
| 2014/0215365 | A1 * | 7/2014 | Hiraga | G06F 3/04883 |
| | | | | 715/765 |
| 2017/0118409 | A1 * | 4/2017 | Im | H04N 23/631 |
| 2017/0177197 | A1 * | 6/2017 | Waggoner | G06F 3/167 |
| 2018/0260718 | A1 * | 9/2018 | Biswas | G06F 40/20 |
| 2018/0336414 | A1 * | 11/2018 | Badr | G06F 16/90332 |
| 2018/0336415 | A1 * | 11/2018 | Anorga | G06N 20/00 |
| 2019/0189041 | A1 * | 6/2019 | Ishizaki | G06F 3/0416 |
| 2022/0091706 | A1 * | 3/2022 | Winn | G06F 16/54 |

FOREIGN PATENT DOCUMENTS

JP 2019074948 A 5/2019
WO WO-2015159498 A1 * 10/2015 ........... G06F 3/0482

* cited by examiner

*Primary Examiner* — Beau D Spratt
(74) *Attorney, Agent, or Firm* — Canon U.S.A., Inc. IP Division

(57) ABSTRACT

A control method of an information processing apparatus includes specifying a changed displayed content in a case where a displayed content on a display is changed, and displaying a predetermined item on the display, the predetermined item being an item based on the specified changed displayed content and being an item for performing a predetermined process using at least a part of the specified changed displayed content.

18 Claims, 7 Drawing Sheets

FIG.6

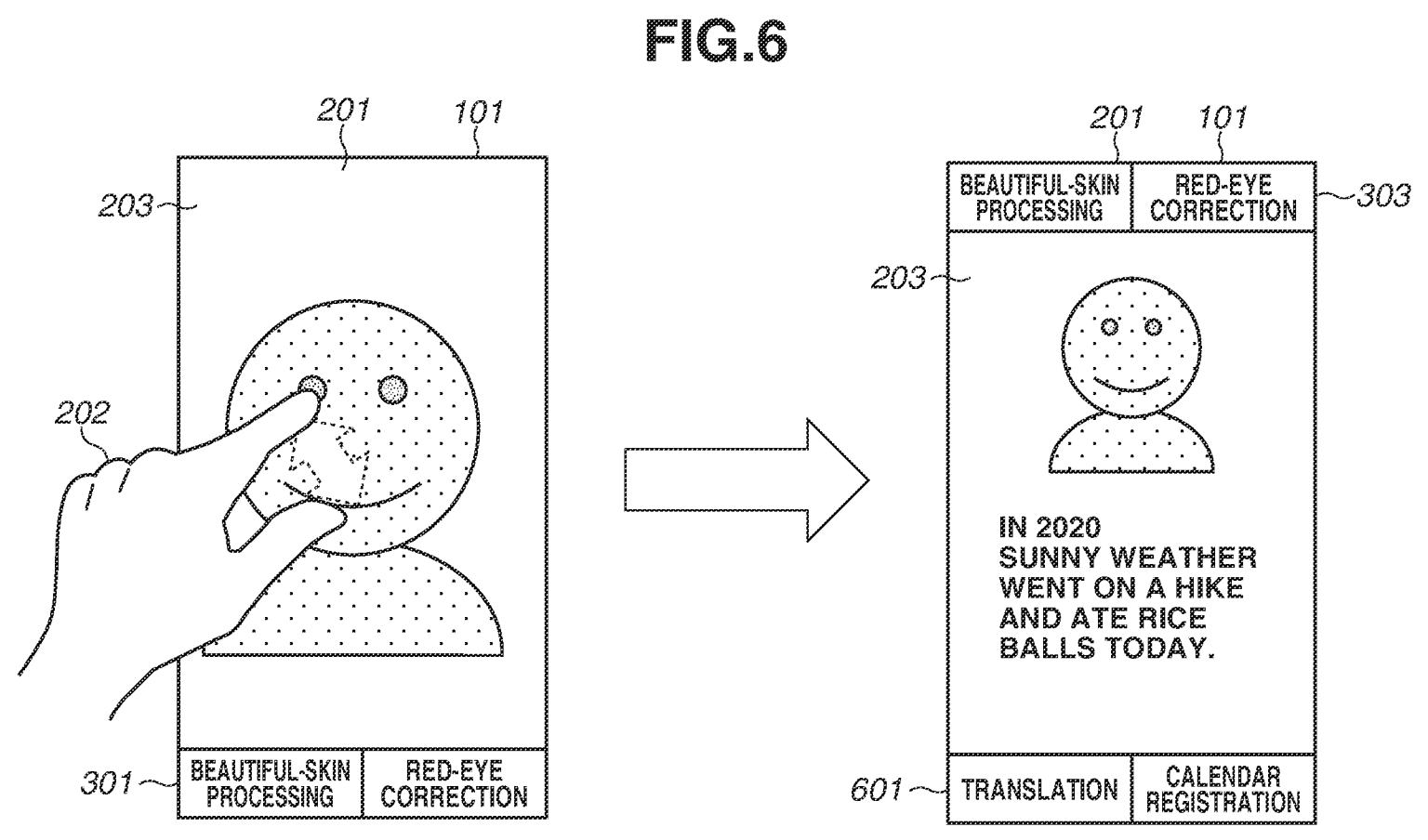

BEAUTIFUL-SKIN PROCESSING | RED-EYE CORRECTION 201  101

203

202

301

BEAUTIFUL-SKIN PROCESSING | RED-EYE CORRECTION

303

201  101

IN 2020
SUNNY WEATHER
WENT ON A HIKE
AND ATE RICE
BALLS TODAY.

203

TRANSLATION | CALENDAR REGISTRATION

601

INFORMATION PROCESSING APPARATUS AND INFORMATION PROCESSING METHOD FOR SPECIFYING A CHANGED DISPLAY CONTENT

BACKGROUND

Field of the Disclosure

The present disclosure relates to an information processing apparatus, an information processing method, and a storage medium.

Description of the Related Art

In recent years, information processing apparatuses including a touch panel, such as smartphones and tablet terminals, have become widely prevalent, and a large variety of applications has been executed on the information processing apparatuses.

Along with this, various kinds of functions have been executable in the applications, and it has been becoming a common practice to provide many functions in one application.

As an example of a means for providing functions in an application, there is a means for providing predetermined functions in response to user operations. Japanese Patent Application Laid-Open No. 2019-74948 discusses a method for providing functions of deleting and copying a selected object based on the direction of pinch-in (reduction) or pinch-out (enlargement) among touch panel operations. According to this method, it is possible to provide functions to the user without always holding a display area for displaying a wide variety of functions.

The use of the method discussed in Japanese Patent Application Laid-Open No. 2019-74948 makes it possible to provide a plurality of functions to the user without displaying a menu in an application.

However, according to the method discussed in Japanese Patent Application Laid-Open No. 2019-74948, it is necessary to predetermine functions to be provided based on the directions of operations, and thus there is an issue that many functions cannot be provided.

For example, in a case where the user wishes to make red-eye correction to an image of a person on a screen on which the image of the person and a text are displayed, the user needs to enlarge the image of the person, select the person's eyes, open an image processing menu, and select red-eye correction. In a case where the user wishes to translate the text, the user needs to move to the text, select the relevant region, open a translation menu, and select the menu item. These processes will take the user a great deal of time and effort.

SUMMARY

In view of the issue described above, the present disclosure is directed to reducing the user's time and effort in selecting a desired function.

A control method of an information processing apparatus includes specifying a changed displayed content in a case where a displayed content on a display is changed, and displaying a predetermined item on the display, the predetermined item being an item based on the specified changed displayed content and being an item for performing a predetermined process using at least a part of the specified changed displayed content.

Further features of the present disclosure will become apparent from the following description of exemplary embodiments with reference to the attached drawings.

BRIEF DESCRIPTION OF THE DRAWINGS

FIG. 6 is a diagram for describing a method for displaying an operation menu in response to a pinch-in.

DESCRIPTION OF THE EMBODIMENTS

Figure 1:
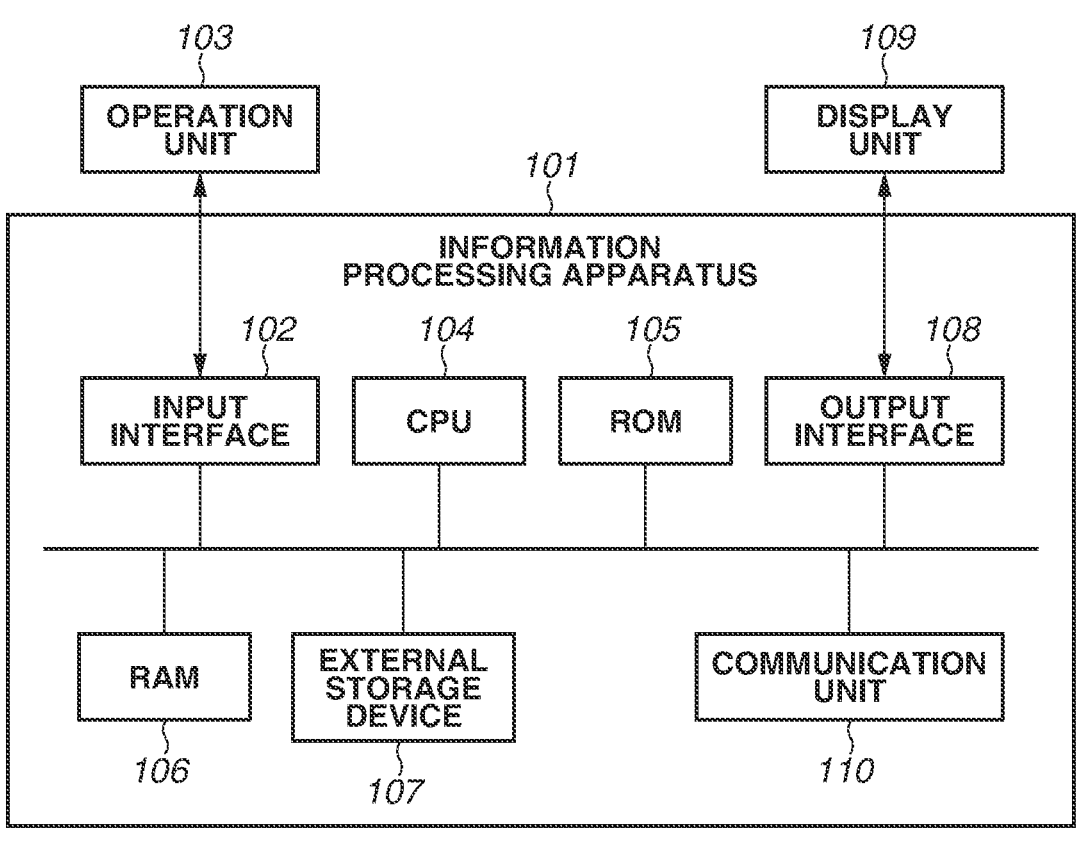
FIG. 1 is a block diagram illustrating a hardware configuration example of an information processing apparatus according to one or more aspects of the present disclosure.

A first exemplary embodiment of the present disclosure will be described with reference to the drawings. The following exemplary embodiments are examples for describing the present disclosure, and are not intended to limit the present disclosure to these exemplary embodiments.

A hardware configuration example of an information processing apparatus in the present exemplary embodiment will be described with reference to FIG. 1. In the present exemplary embodiment, the following configuration is taken as an example. However, the present exemplary embodiment is applicable to apparatuses having a display unit such as a touch screen display, and is not intended to limit the functions of the information processing apparatus to those illustrated in the drawings.

An information processing apparatus 101 includes an input interface 102, an operation unit 103, a central processing unit (CPU) 104, a read only memory (ROM) 105, a random access memory (RAM) 106, an external storage device 107, an output interface 108, a display unit 109, and a communication unit 110. These components are connected to one another via a system bus.

The input interface 102 is an interface for accepting data input and operation instructions from a user via the operation unit 103 to be described below.

The operation unit 103 is formed of operators such as a physical keyboard, buttons, and a touch panel. The display unit 109 and the operation unit 103 to be described below may be at least partially integrated, and for example, may be formed so as to output a screen and accept user operations on the same screen.

The CPU 104 is a system control unit that controls the entire operation of the information processing apparatus 101 such as execution of programs and activation of hardware.

The ROM 105 stores fixed data such as control programs and data tables to be executed by the CPU 104, an incorporated operating system (hereinafter, called OS), and programs. In the present exemplary embodiment, the control programs stored in the ROM 105 are used to perform software execution controls such as scheduling, task switching, interruption processing, under the control of the incorporated OS stored in the ROM 105.

The RAM 106 is formed of a static random access memory (SRAM) or a dynamic random access memory (DRAM) requiring a backup power source. The RAM 106 may store data by the use of a primary battery for data backup not illustrated. In this case, the RAM 106 can hold important data such as program control variables without volatilizing the data. The RAM 106 also has a memory area for storing setting information about the information processing apparatus 101 and management data about the information processing apparatus 101. The RAM 106 is also used as a main memory and a work memory of the CPU 104.

The external storage device 107 stores various applications, contents data handled in the applications, and the like.

The output interface 108 is an interface for controlling the display unit 109 to display data and notify the state of the information processing apparatus 101.

The display unit 109 is formed of a light-emitting diode (LED), a liquid crystal display (LCD), or the like, which displays data or notifies the state of the information processing apparatus 101. On the display unit 109, a software keyboard including numeric input keys, mode setting keys, confirmation key, cancel key, and power key may be provided to accept user input via the display unit 109.

The communication unit 110 is configured to connect to an external device and execute data communication.

Figure 2:
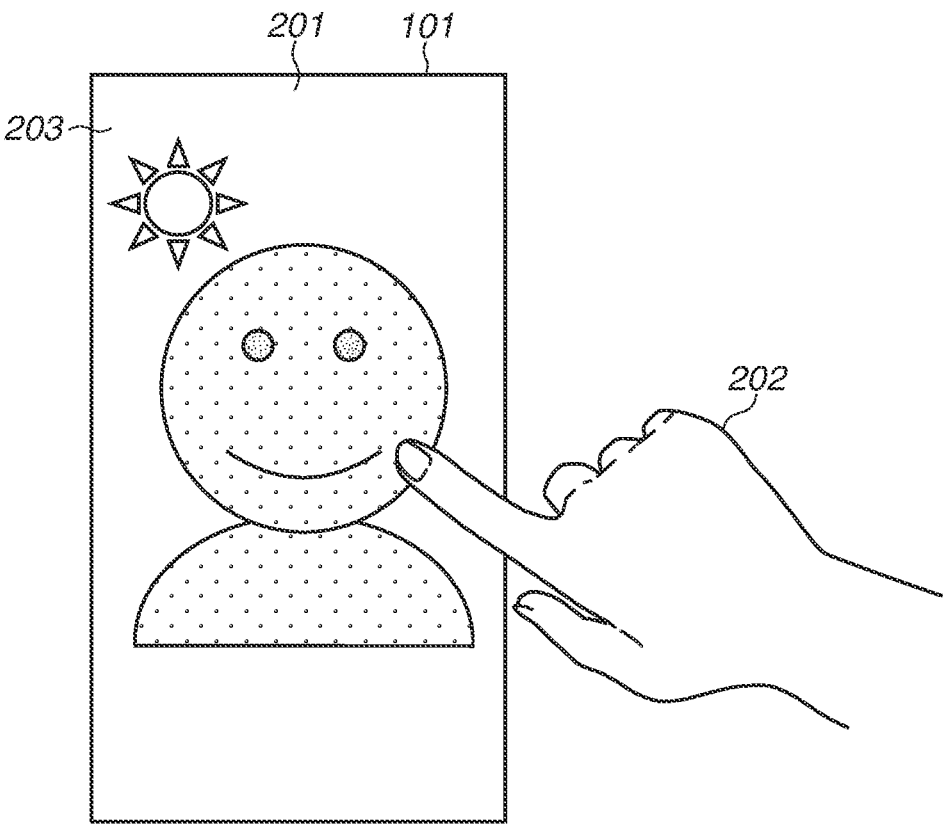
FIG. 2 is a diagram illustrating an example of a display screen on a touch screen display equipped with a touch panel.

FIG. 2 is a diagram illustrating an example of a display screen on the touch screen display 201 equipped with a touch panel according to the present exemplary embodiment. The touch screen display 201 displays one or more graphics in the user interface (UI). In the present exemplary embodiment, the user makes a gesture on the graphic by using one or more fingers 202 (not illustrated to scale in the drawing), for example, thereby to operate the screen of the application stored in the ROM 105.

The application has a screen such as a setting screen 203. The screen includes a display area of an operation menu to be described below with reference to FIG. 3, and can present an operation menu related to a user operation (movement, enlargement, reduction, or the like).

A series of processes of processing to be performed by the information processing apparatus 101 according to the present exemplary embodiment will be described with reference to the flowcharts of FIGS. 3 and 4.

Figure 3:
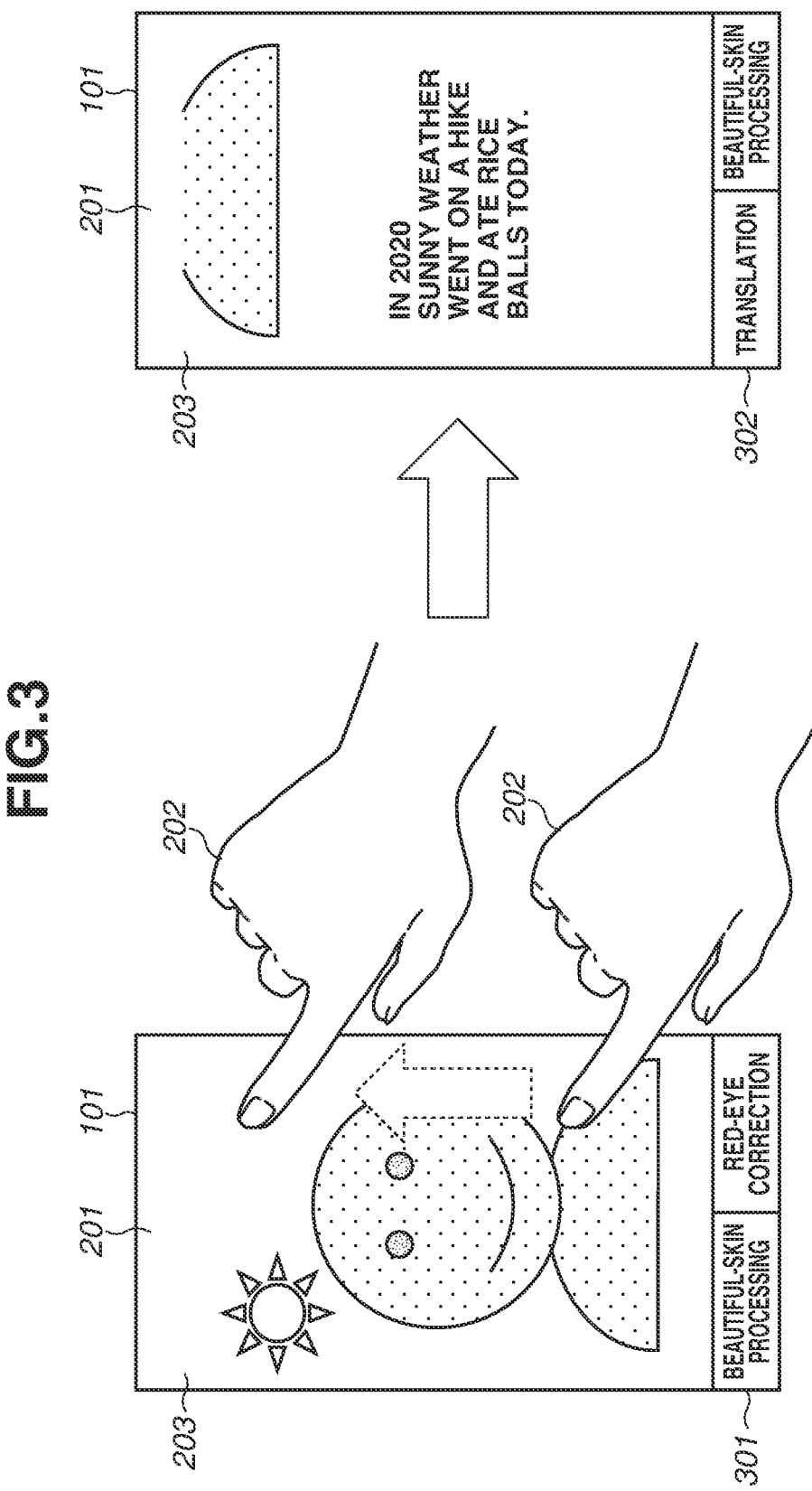
FIG. 3 is a diagram for describing a method for displaying an operation menu.

FIG. 3 is a diagram illustrating the behavior of the information processing apparatus 101 changing from an operation menu 301 to an operation menu 302 in response to a user's gesture operation of swipe on the setting screen 203 with a finger 202 in an arrow direction indicated by broken lines. FIG. 4 is a flowchart describing a procedure of processing by the information processing apparatus 101 with the behavior illustrated in FIG. 3.

FIG. 3 illustrates the operation menu 301 displayed on the screen when the user's touch operation is started. However, the operation menu 301 is not necessarily required to be displayed.

Figure 4:
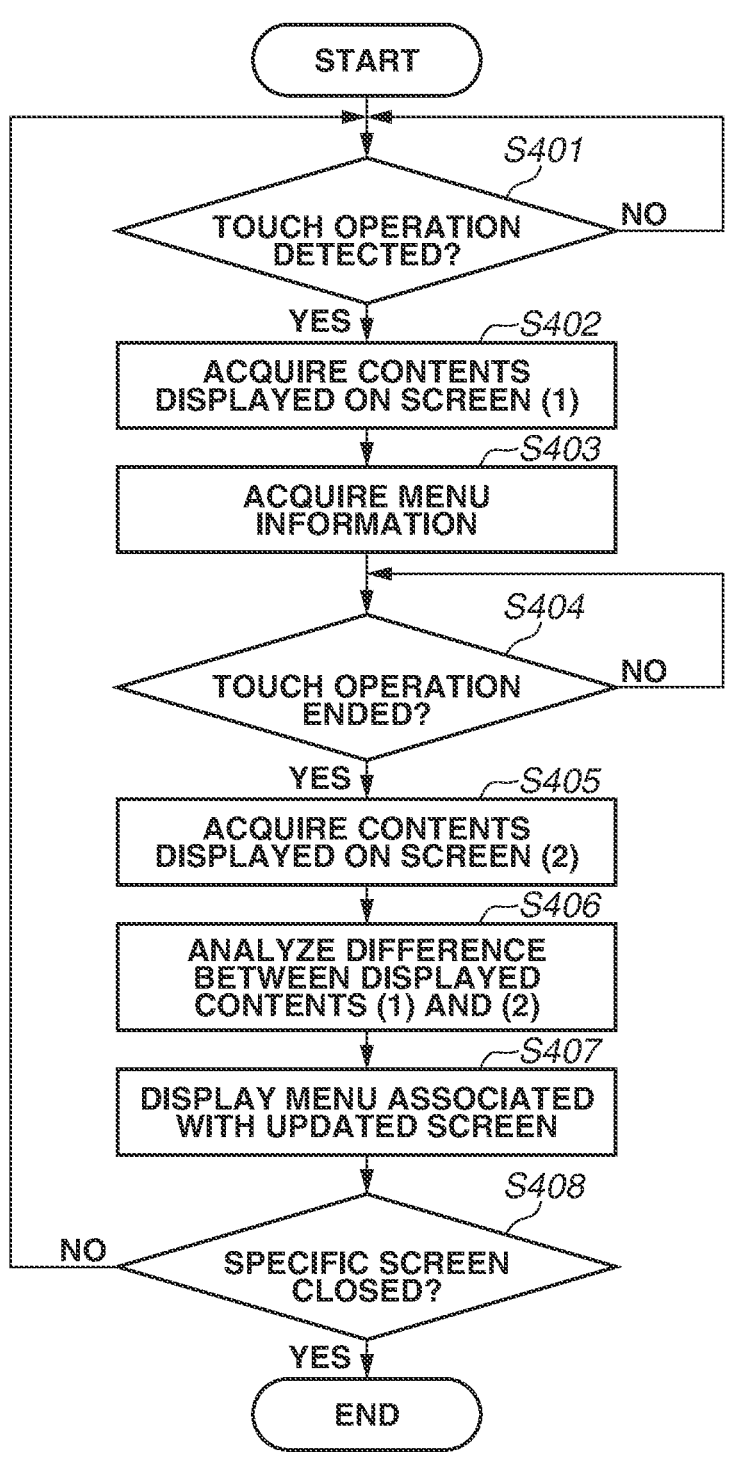
FIG. 4 is a flowchart describing an example of a process procedure according to one or more aspects of the present disclosure.

The process in the flowchart of FIG. 4 is started in response to the display of a specific screen such as the setting screen 203 on an application or the OS.

In step S401, the CPU 104 waits for detection of movement of the user's finger 202. In a case where the CPU 104 detects the movement of the finger 202 (YES in step S401), the process proceeds to step S402. With reference to FIG. 3, for example, in a case where the CPU 104 detects a touch operation by the user's finger 202 on the touch screen display 201 and detects the movement of the finger 202, the process proceeds to step S402.

In step S402, the CPU 104 acquires information on contents displayed on the setting screen 203, and stores the acquired information in the RAM 106. The information on the displayed contents includes classification information of texts, images, and the like, and information on detailed contents (an image of a person or an image of an animal), for example.

In step S403, on the basis of the contents displayed on the setting screen 203, the CPU 104 acquires information on the operation menu to be displayed, and stores the acquired information in the RAM 106. With reference to FIG. 3, for example, an image of a person is displayed on the setting screen 203, and the CPU 104 acquires person-related items "red-eye correction" and "beautiful-skin processing" as operation menu items to be displayed.

In step S404, the CPU 104 waits for the end of movement of the finger 202. At the end of movement of the finger 202 (YES in step S404), the process proceeds to step S405. With reference to FIG. 3, for example, in a case where the movement of the user's finger 202 is stopped and the scroll operation is ended, the process proceeds to step S405.

In step S405, the CPU 104 acquires information on the contents displayed on the setting screen 203 when the movement of the finger 202 is ended in step S404, and stores the acquired information in the RAM 106.

In step S406, the CPU 104 analyzes a difference between the information acquired and stored in the RAM 106 in steps S402 and S403 and the information acquired and stored in the RAM 106 in step S405. The CPU 104 determines an operation menu to be updated on the basis of the change in the setting screen 203 (the difference obtained by the analysis), and stores the information on the operation menu to be displayed on the setting screen 203 in the RAM 106.

Specifically, with reference to FIG. 3, a state of the setting screen 203 is changed from the state of displaying the image of a person to the state of displaying a text. Thus, the CPU 104 determines that the person's face-related item "red-eye correction" is to be changed to the text-related item "translation", and stores the information on the operation menu 302 in the RAM 106.

In step S407, the CPU 104 performs a control to display the operation menu 302 stored in the RAM 106 on the display unit 109. In this way, the user can select a desired operation menu item in accordance with the contents displayed on the display unit 109.

In step S408, the CPU 104 determines whether the specific screen such as the setting screen 203 is closed. In a case where the CPU 104 determines that the specific screen is closed (YES in step S408), the process in the flowchart is ended. On the other hand, in a case where the CPU 104 determines that the specific screen is not closed (NO in step S408), the process returns to step S401.

As described above, in the present exemplary embodiment, a control is performed to display appropriate items on the display unit, on the basis of information before and after the user's operation. In this way, the user's time and effort in selecting a desired function can be reduced.

In the present exemplary embodiment, in step S403, the CPU 104 acquires an operation menu to be displayed on the basis of the displayed contents when the user's touch operation is started. However, this step may be omitted. In this case, in step S406, the CPU 104 analyzes the change in the displayed contents on the basis of the information about the displayed contents at the start of the user's touch operation acquired in step S402 and the information about the displayed contents at the end of the user's touch operation acquired in step S405. In response to the change in the displayed contents, the CPU 104 determines the operation menu to be displayed on the display unit 109.

In the present exemplary embodiment, the CPU 104 determines the operation menu to be updated on the basis of the change in the setting screen 203 (the difference obtained by the analysis). However, the present disclosure is not limited to this mode. The CPU 104 may determine the operation menu to be updated from only the contents displayed on the setting screen 203 when the movement of the finger 202 is ended in step S404, without analysis of the difference. Specifically, for example, the CPU 104 may determine the operation menu to be updated on the basis of whether the contents displayed on the setting screen 203 when the movement of the finger 202 is ended in step S404 are a text or an image. In a case where the contents displayed on the setting screen 203 when the movement of the finger 202 is ended in step S404 are an image, the CPU 104 may determine the operation menu to be updated on the basis of whether the image is an image of a person or an image of an animal. The contents displayed on the setting screen 203 when the movement of the finger 202 is ended in step S404 may be determined using a publicly known object extraction technique. For example, the publicly known technique may be Adaboost by which a strong discriminator is created from a plurality of weak discriminators or may be a deep neural network.

In the first exemplary embodiment, an example of processing in response to a user's scroll operation on the setting screen 203 has been described. In contrast to the first exemplary embodiment, in a second exemplary embodiment, an example of processing in response to a user's operation of enlarging a displayed object (hereinafter, pinch-out) or a user's operation of reducing a displayed object (hereinafter, pinch-in) on a setting screen 203 will be described.

An internal configuration of an information processing apparatus 101 according to the present exemplary embodiment is similar to that illustrated in FIG. 1, and thus description thereof will be omitted. Herein, a case specific to the present exemplary embodiment, that is, a case where a change in displayed contents including a position of an operation menu is required due to the enlargement/reduction operation will be described.

Processing to be performed by the information processing apparatus 101 according to the present exemplary embodiment will be described with reference to the flowcharts in FIGS. 5, 6, and 7.

Figure 5:
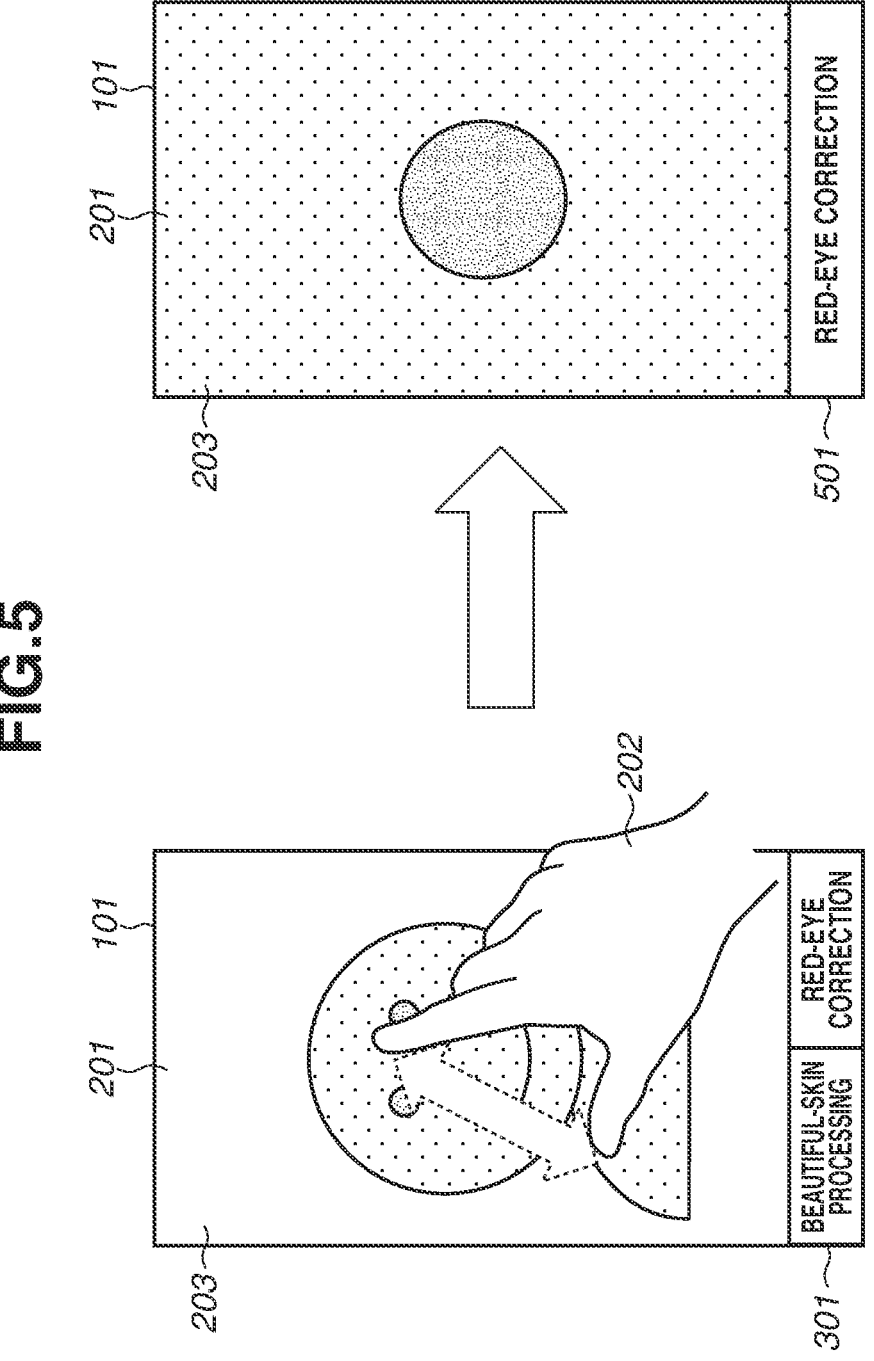
FIG. 5 is a diagram for describing a method for displaying an operation menu in response to a pinch-out.

FIG. 5 is a diagram illustrating the behavior of a setting screen 203 in response to enlarged display by a pinch-out gesture. FIG. 6 is a diagram illustrating the behavior of the setting screen 203 in response to reduced display by a pinch-in gesture. FIG. 7 is a flowchart describing an example of procedure of processing to be performed by the information processing apparatus 101 with the behavior illustrated in FIG. 5 or 6.

With reference to FIGS. 5 and 6, an operation menu 301 is displayed when a user's touch operation is started. However, the operation menu 301 is not necessarily required to be displayed.

Figure 7:
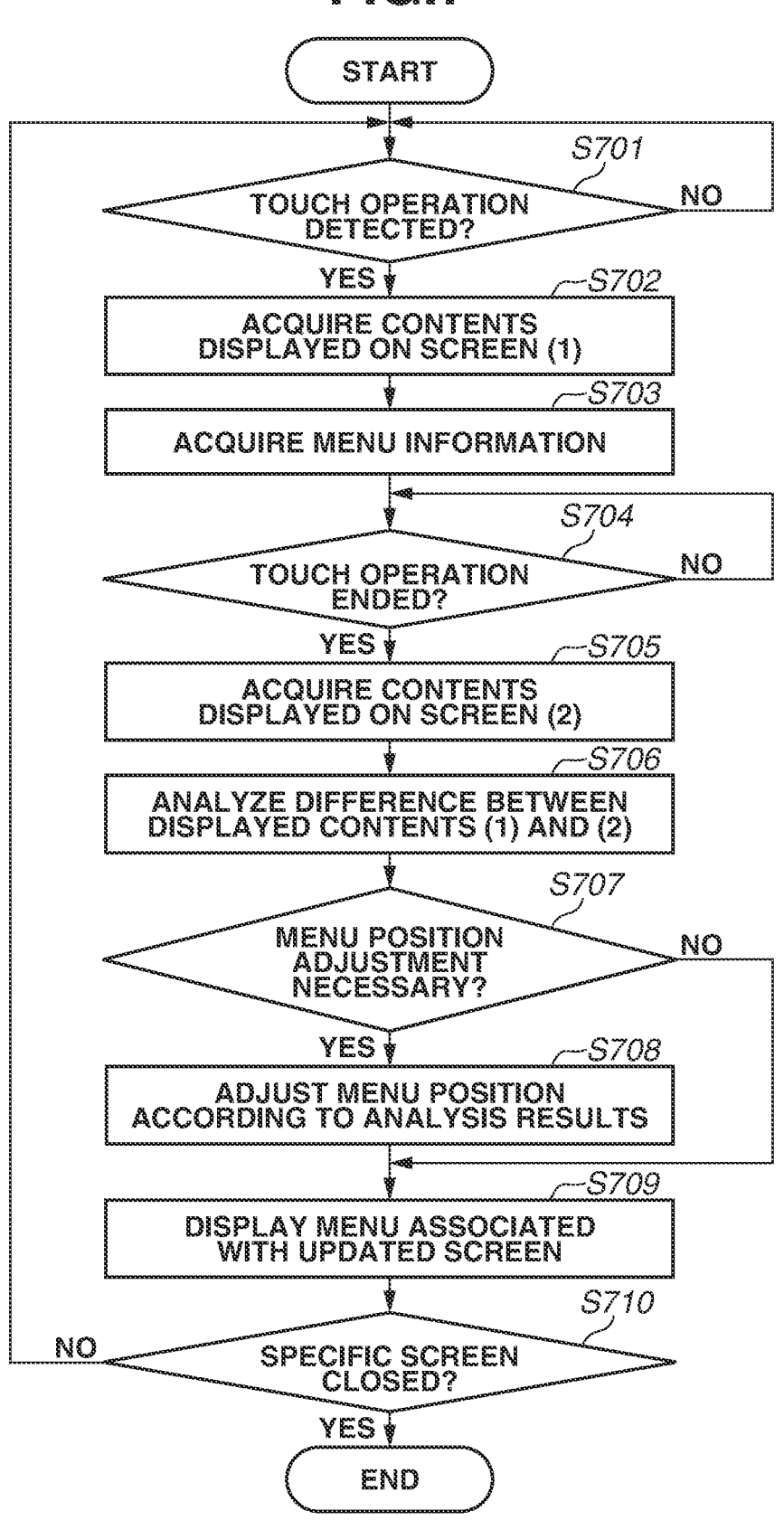
FIG. 7 is a flowchart describing an example of a process procedure according to one or more aspects of the present disclosure.

The processing in the flowchart of FIG. 7 is started on the condition that a specific screen such as the setting screen 203 is displayed on an application or the OS.

In step S701, a CPU 104 waits for the detection of movement of a user's finger 202. In a case where the CPU 104 detects the movement of the finger 202 (YES in step S701), the process proceeds to step S702. For example, with reference to FIGS. 5 and 6, in a case where a touch screen display 201 is touched by the user with a plurality of fingers and the CPU 104 detects the movement of at least one of the fingers via an input interface 102, the process proceeds to step S702.

In steps S702 and S703, the CPU 104 performs operations similar to those in steps S402 and S403 in the first exemplary embodiment.

In step S704, the CPU 104 waits for the end of movement of the finger 202. In a case where the CPU 104 detects the end of movement of the finger 202 (YES in step S704), the process proceeds to step S705.

For example, with reference to FIGS. 5 and 6, in a case where the CPU 104 detects that the movement of the user's finger is stopped and that the pinch-in or pinch-out operation is ended (YES in step S704), the process proceeds to step S705.

In step S705, the CPU 104 performs an operation similar to that in step S405 in the first exemplary embodiment.

In step S706, the CPU 104 analyzes the difference between the information acquired and stored in the RAM 106 in steps S703 and S704 and the information acquired and stored in the RAM 106 in step S705. The CPU 104 determines the operation menu to be updated on the basis of the change in the setting screen 203 (the difference obtained by the analysis), and stores the information on the operation menu in the RAM 106.

Specifically, with reference to FIG. 5, the CPU 104 stores the items "beautiful-skin processing" and "red-eye correction" in the RAM 106 in step 704, and the CPU 104 stores the image of the eyes in the RAM 106 in step 706 in response to the enlarged display of the image on the setting screen 203. With reference to FIG. 5, a part of an eye of the person is enlarged by the user's pinch-out operation. Thus, in step S707, the CPU 104 determines that a human's eye-related item "red-eye correction" is to be displayed as an operation menu item (YES in step S707), and stores the information on an operation menu 501 in the RAM 106.

With reference to FIG. 6, the CPU 104 stores the items "beautiful-skin processing" and "red-eye correction" in the RAM 106 in step 704, and, the CPU 104 stores the image of the person and textual information in the RAM 106 in step 706 in response to the reduced display of the image on the setting screen 203. FIG. 6 illustrates a state in which the image of the person and the text are displayed by the user's pinch-in operation. Thus, in step S707, the CPU 104 determines the person-related items "red-eye correction" and "beautiful-skin processing" and text-related items "translation" and "calendar registration" as operation menu items, and stores the information on an operation menu 601 in the RAM 106.

In step S707, the CPU 104 determines whether it is necessary to adjust the display position of the operation menu based on the results of the analysis in step S706.

In a case where the CPU 104 determines that it is necessary to adjust the display position of the operation menu (YES in step S707), the process proceeds to step S708. On the other hand, in a case where the CPU 104 determines that it is not necessary to adjust the display position of the operation menu (NO in step S707), the process proceeds to step S709.

In step S708, the CPU 104 adjusts the display position of the operation menu in accordance with the results of the analysis in step S706.

Specifically, with reference to FIG. 5, because there is the information on the item "red-eye correction" in step S707, the CPU 104 determines the position where the operation menu item "red-eye correction" is to be displayed based on the information stored in the RAM 106 in step S704. For example, because the "red-eye correction" is an operation menu item related to the person's eyes, for example, the CPU 104 determines the display position such that the operation menu item is displayed at a position near the person's eyes and not overlapping the display region of the person's eyes.

With reference to FIG. 6, the operation menu items determined in step S707 are the person-related items "red-eye correction" and "beautiful-skin processing" and the text-related items "translation" and "calendar registration". Thus, the CPU 104 determines that the operation menu items "red-eye correction" and "beautiful-skin processing" are to be displayed near the person image and determines that the operation menu items "translation" and "calendar registration" are to be displayed near the text.

In step S709, the CPU 104 performs a control to display the operation menu items determined in step S707 on the display unit 109. Specifically, with reference to FIG. 5, the CPU 104 performs a control to display the operation menu 501, and with reference to FIG. 6, the CPU 104 performs a control to display the operation menus 303 and 601.

In step S710, the CPU 104 determines whether the specific screen such as the setting screen 203 has been closed. In a case where the CPU 104 determines that the specific screen has been closed (YES in step S710), the process in the flowchart is ended. On the other hand, in a case where the CPU 104 determines that the specific screen has not been closed (NO in step S710), the process returns to step S701.

As described above, in the exemplary embodiment, the CPU 104 performs a control to display appropriate items on the display unit based on the information before and after the user's operation (for example, the information indicating whether the displayed contents are enlarged or reduced). In this way, the user's time and effort in selecting a desired function can be reduced.

In the present exemplary embodiment, in step S708, the display position of the operation menu is adjusted. However, the object to be adjusted is not limited to the display position, and the display size of the operation menu may be adjusted, for example.

In the present exemplary embodiment, the operation menu to be updated is determined on the basis of the change in the setting screen 203 (the difference obtained by the analysis). However, the present disclosure is not limited to this mode. The operation menu to be updated may be determined only based on the contents displayed on the setting screen 203 at a point of time when the movement of the user's finger is stopped and the pinch-in operation or pinch-out operation is ended, without analysis of the difference. Specifically, for example, the operation menu to be updated may be determined on the basis of whether the contents displayed on the setting screen 203 are a text or an image at a point of time when the movement of the user's finger is stopped and the pinch-in operation or pinch-out operation is ended. In a case where the contents displayed on the setting screen 203 are an image at a point of time when the movement of the user's finger is stopped and the pinch-in operation or pinch-out operation is ended, the operation menu to be updated may be determined based on whether the image is an image of a person or an image of an animal. The contents displayed on the setting screen 203 at a point of time when the movement of the user's finger is stopped and the pinch-in operation or pinch-out operation is ended may be determined using a publicly known object extraction technique. For example, the publicly known technique may be Adaboost by which a strong discriminator is created from a plurality of weak discriminators or may be a deep neural network.

Other Exemplary Embodiments

There are various available methods for displaying a menu in a case where the user performs both a pinch-put and a pinch-in while touching on the screen. For example, it is assumed that the user touches the screen with a plurality of fingers and then repeats a pinch-out and a pinch-in to perform enlargement and reduction, and then releases the plurality of fingers from the screen.

In this case, the menu display may be changed in accordance with the contents of the change in the screen during repetition of enlargement and reduction by a pinch-out and a pinch-in (before the release of the fingers) or the menu display may not be changed before the release of the fingers but may be changed after the release of the fingers.

In the former display method, the process is specifically executed as described below. For example, in steps S401 and S701 described above, in a case where a pinch-out or a pinch-in is started, it is determined that a touch operation is detected. In steps S404 and S704, even though the fingers are not released, in a case where the pinch-out or the pinch-in is ended (that is, in a case where the movement of the fingers is stopped), it is determined that the touch operation is ended.

In the latter display method, the process is specifically executed as described below. For example, in steps S401 and S701 described above, in a case where the screen is touched at a plurality of position, it is determined that a touch operation is detected. In steps S404 and S704, in a case where the fingers are released, it is determined that the touch operation is ended.

The former display method has an advantageous effect that the user can perform a pinch-out or a pinch-in while checking the change in the menu display. On the other hand, in the latter display method, the change in the displayed contents from the time of touch to the time of release is reflected on the menu display. Thus, for example, it is assumed that the user enlarges the displayed contents by a pinch-in for enlarged display, and slightly reduces the enlarged contents for size adjustment without releasing the fingers, for example. In this case, in the latter display method, this operation is determined as "enlargement", which produces an advantageous effect that the menu can be displayed at the user's wishes.

The above-described two display methods may be changed in accordance with the user's operation or may be changed in accordance with the type of the displayed contents, for example.

In the above-described exemplary embodiments, the menu display is controlled in accordance with the enlargement and reduction of the displayed contents. Alternatively, the menu display may be controlled such that the menu is displayed only in response to the enlargement and disappears in response to the reduction. In this case, because the menu is newly displayed in response to the user's enlarging an attention region in the screen, it is possible to inform the user of the presence of the new menu in a clearer manner.

The present disclosure can also be realized by supplying a program for implementing one or more functions in the above-described exemplary embodiments to a system or an apparatus via a network or a storage medium, and reading and executing the program by one or more processors in a computer of the system or apparatus. The present disclosure can be realized by a circuit implementing one or more functions (for example, application specific integrated circuit (ASIC)).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072425, filed Apr. 26, 2022, which is hereby incorporated by reference herein in its entirety.

What is claimed is:

1. A control method of an information processing apparatus, the control method comprising:
   determining a displayed content change of a first image on a display;
   specifying the changed displayed content of the first image based on a pinch-in operation or a pinch-out operation on the first image;
   detecting at least one object in the changed displayed content based on analysis of the displayed content that is displayed when the pinch-in or pinch-out operation is started and the displayed content that is displayed when the pinch-in or pinch-out operation is ended; and
   displaying a predetermined item on the display, the predetermined item being an item based on the detected object and the specified changed displayed content and being an item for correcting the specified changed displayed content,
   wherein the pinch-in or pinch-out operation is started when a pointing object that performs the pinch-in or pinch-out operation touches the display, and the pinch-in or pinch-out operation is ended when the pointing object is released from the display, and wherein even in a case where the pinch-in or pinch-out operation is performed a plurality of times on the display and the displayed content is changed a plurality of times before the pointing object that performs the pinch-in or pinch-out operation is released from the display, the predetermined item is neither changed nor displayed on the display each time the displayed content is changed, and the predetermined item is displayed on the display based on the changed displayed content in a case where the pointing object is released from the display.

2. The control method according to claim 1, wherein the predetermined item is an item based on a type of an object included in the changed displayed content.

3. The control method according to claim 1, wherein in a case where the changed displayed content includes an image, an item for correcting the image is displayed as the predetermined item.

4. The control method according to claim 3, wherein in a case where the changed displayed content includes an image of a face, an item for making red-eye correction to the image of the face is displayed as the predetermined item.

5. The control method according to claim 1, wherein in a case where the changed displayed content includes text, an item for translating the text is displayed on the display as the predetermined item.

6. The control method according to claim 1,
   wherein the predetermined item specified based on an object included in the specified changed displayed content is displayed on the display, and
   wherein in a case where the specified changed displayed content includes a first object and a second object, a plurality of predetermined items including the predetermined item based on the first object and the predetermined item based on the second object is displayed on the display.

7. The control method according to claim 6, wherein the first object is an image and the second object is text.

8. The control method according to claim 1,
   wherein the predetermined item specified based on an object included in the specified changed displayed content is displayed on the display, and
   wherein a position where the predetermined item is displayed is controlled based on the object that is included in the changed displayed content and used for specifying the predetermined item.

9. The control method according to claim 8,
   wherein in a case where the specified changed displayed content includes a first object and a second object positioned under the first object in the displayed content, a plurality of predetermined items including the predetermined item based on the first object and the predetermined item based on the second object is displayed on the display, and
   wherein in a case where the first object is positioned under the second object in the displayed content, the predetermined item based on the first object is controlled to be displayed at a position under the predetermined item based on the second object.

10. The control method according to claim 1, wherein the displayed content on the display is changed in response to a predetermined user operation.

11. The control method according to claim 10, wherein the changed displayed content is the displayed content when the predetermined user operation is ended.

12. The control method according to claim 10, further comprising acquiring the displayed content that is displayed when the predetermined user operation is started and the displayed content that is displayed when the predetermined user operation is ended, and wherein the predetermined item specified based on the acquired displayed content that is displayed when the predetermined user operation is started and the acquired displayed content that is displayed when the predetermined user operation is ended is displayed on the display.

13. The control method according to claim 1, wherein a predetermined user operation is at least any of scroll, pinch-in, and pinch-out.

14. The control method according to claim 1, wherein the predetermined item specified based on an object included in the specified changed displayed content is displayed on the display, and wherein the object included in the specified changed displayed content is specified based on AdaBoost or a neural network.

15. The control method according to claim 1, wherein in a case where a first display method is set by a user operation, even in a case where the pinch-in or pinch-out operation is performed a plurality of times on the display and the displayed content is changed a plurality of times before the pointing object that performs the pinch-in or pinch-out operation is released from the display, the predetermined item is neither changed nor displayed on the display each time the displayed content is changed, and the predetermined item is displayed on the display based on the changed displayed content in a case where the pointing object is released from the display.

16. The control method according to claim 15, wherein in a case where a second display method, instead of the first display method, is set by a user operation, the pinch-in or pinch-out operation is started when an action of the pointing object that performs the pinch-in operation or the pinch-out operation is started on the display, and the pinch-in operation or the pinch-out operation is ended when the action of the pointing object that performs the pinch-in operation or the pinch-out operation is stopped on the display, and in a case where the pinch-in operation or the pinch-out operation is performed a plurality of times on the display and the displayed content is changed a plurality of times before the pointing object that performs the pinch-in operation or the pinch-out operation is released from the display, the predetermined item is changed and displayed on the display each time the displayed content is changed.

17. An information processing apparatus comprising:

one or more memories storing instructions; and one or more processors executing the instructions to function as:

a determination unit configured to determine a displayed content change of a first image on a display;

a specification unit configured to specify the changed displayed content of the first image based on a pinch-in operation or a pinch-out operation on the first image;

a detection unit configured to detect at least one object in the changed displayed content based on analysis of the displayed content that is displayed when the pinch-in or pinch-out operation is started and the displayed content that is displayed when the pinch-in or pinch-out operation is ended; and a display control unit configured to display a predetermined item on the display, the predetermined item being an item based on the detected object and the specified changed displayed content and being an item for correcting the specified changed displayed content, wherein the pinch-in or pinch-out operation is started when a pointing object that performs the pinch-in or pinch-out operation touches the display, and the pinch-in or pinch-out operation is ended when the pointing object is released from the display, and wherein even in a case where the pinch-in or pinch-out operation is performed a plurality of times on the display and the displayed content is changed a plurality of times before the pointing object that performs the pinch-in or pinch-out operation is released from the display, the predetermined item is neither changed nor displayed on the display each time the displayed content is changed, and the predetermined item is displayed on the display based on the changed displayed content in a case where the pointing object is released from the display.

18. A non-transitory computer readable storage medium storing a program for causing a computer to execute a control method of an information processing apparatus, the control method comprising:

determining a displayed content change of a first image on a display;

specifying the changed displayed content of the first image based on a pinch-in operation or a pinch-out operation on the first image;

a detecting unit configured to detect at least one object in the changed displayed content based on analysis of the displayed content that is displayed when the pinch-in or pinch-out operation is started and the displayed content that is displayed when the pinch-in or pinch-out operation is ended; and displaying a predetermined item on the display, the predetermined item being an item based on the detected object and the specified changed displayed content and being an item for correcting the specified changed displayed content, wherein the pinch-in or pinch-out operation is started when a pointing object that performs the pinch-in or pinch-out operation touches the display, and the pinch-in or pinch-out operation is ended when the pointing object is released from the display, and wherein even in a case where the pinch-in or pinch-out operation is performed a plurality of times on the display and the displayed content is changed a plurality of times before the pointing object that performs the pinch-in or pinch-out operation is released from the display, the predetermined item is neither changed nor displayed on the display each time the displayed content is changed, and the predetermined item is displayed on the display based on the changed displayed content in a case where the pointing object is released from the display.

* * * * *